United States Patent [19]
Kim

[11] Patent Number: 6,049,361
[45] Date of Patent: Apr. 11, 2000

[54] AUTOMATIC GAIN CONTROL CIRCUIT AND METHOD THEREFOR

[75] Inventor: Ki-bum Kim, Seoul, Rep. of Korea

[73] Assignee: Samsung Electronics Co., Ltd., Suwon, Rep. of Korea

[21] Appl. No.: 08/872,189

[22] Filed: Jun. 10, 1997

[30] Foreign Application Priority Data

Jun. 11, 1996 [KR] Rep. of Korea ............ 96-20738

[51] Int. Cl.$^7$ ............................................. H04N 5/52
[52] U.S. Cl. ..................... 348/678; 348/685; 348/555; 375/345; 455/240.1; 455/247.1; 455/250.1
[58] Field of Search ................... 348/678, 21, 555, 348/558, 685, 725; 375/345, 349; 455/240.1, 247.1, 249.1, 250.1

[56] References Cited

U.S. PATENT DOCUMENTS

| | | | |
|---|---|---|---|
| 4,606,075 | 8/1986 | Eastmond | 455/234.2 |
| 5,086,340 | 2/1992 | Citta et al. | 348/21 |
| 5,546,138 | 8/1996 | Krishnamurthy et al. | 348/735 |
| 5,636,252 | 6/1997 | Patel et al. | 375/345 |
| 5,694,436 | 12/1997 | Huang et al. | 375/345 |
| 5,745,531 | 4/1998 | Sawahashi et al. | 375/345 |

Primary Examiner—Andrew I. Faile
Assistant Examiner—Habte Bahgi
Attorney, Agent, or Firm—Staas & Halsey

[57] ABSTRACT

An automatic gain control (AGC) circuit of a high definition television (HDTV) signal receiver and a method to compensate for a change in amplitude of a high definition signal. The AGC circuit of the high definition signal receiver includes a non-coherent AGC signal generator for generating a first AGC signal according to the magnitude of the IF signal, a coherent AGC signal generator for generating a second AGC signal according to the magnitude of the segment synchronizing signal, and a selector for selecting the second AGC signal when the segment synchronizing signal is detected and the first AGC signal when the segment synchronizing signal is not detected and providing the selected signal to a tuner/IF demodulator. The amplitude of the received signal is controlled within a short period of time using the non-coherent AGC generator and method having a fast response time before a system is stabilized and the amplitude of the received signal is controlled more correctly using the coherent AGC generator and method after the segment synchronizing signal is detected.

26 Claims, 3 Drawing Sheets 6,049,361

1

AUTOMATIC GAIN CONTROL CIRCUIT AND METHOD THEREFOR

BACKGROUND OF THE INVENTION

1. Field of the Invention

The present invention relates to a receiver for receiving a high definition signal, and more particularly, to an automatic gain control circuit of a high definition TV (hereinafter, HDTV) receiver and a method therefor.

In general, in a radio frequency (RF) signal transmitted from a transmitter, the amplitude of a signal is changed by various channel circumstances during transmission and is received by a receiver. In an automatic gain control (hereinafter, AGC) circuit, the amplitude of a received signal with severe changes in the amplitude is uniformly controlled to a predetermined level, which is critical for a digital signal processing system. When the amplitude of the received signal changes, it is not possible to reproduce the original signal since appropriate demodulation is difficult to perform in the receiver.

2. Description of the Related Art

Meanwhile, a conventional AGC circuit used for an RF receiver having a digital signal processor is provided in U.S. Pat. No. 5,451,948. In the conventional AGC circuit provided in the above-mentioned patent, a sampling clock corresponding to a frequency of more than two times an intermediate frequency (IF) signal is required during an analog-to-digital (A/D) conversion since the IF signal is used. Therefore, when the AGC circuit is realized, an expensive device with a very fast operation speed must be used. Also, timing must be correctly adjusted when a front-end AGC signal is forwarded to a back-end AGC loop and an AGC operation is not stable since an input signal is used. In particular, the AGC circuit is minimally effective when it is applied to a GA-HDTV (Grand Alliance-HDTV) system due to the characteristics of a vestigial sideband (VSB), the transfer signal standard of the GA system.

SUMMARY OF THE INVENTION

It is an object of the present invention to provide an automatic gain control (AGC) circuit for compensating for a change in amplitude of a received signal due to channel circumstances during transmission using the amplitude of a received signal and the average amplitude value of a segment synchronous signal and maintaining the amplitude at a uniform level, in a receiver for receiving a high definition signal.

It is another object of the present invention to provide an AGC method for maintaining a received signal at a uniform level using the amplitude of the received signal and the average amplitude value of a segment synchronous signal, in the receiver for receiving the high definition signal.

To achieve the first object, there is provided an automatic gain control (AGC) circuit for a receiver including a tuner/IF demodulator for receiving a high definition signal including a plurality of segments each formed of a segment synchronizing signal and a predetermined number of symbols and outputting an intermediate frequency (IF) signal of a predetermined level according to an automatic gain control (AGC) signal and a synchronizing signal detector for detecting the segment synchronizing signal from the IF signal, in which a non-coherent AGC signal generator generates a first AGC signal according to the magnitude of the IF signal, a coherent AGC signal generator generates a second AGC signal according to the magnitude of the segment synchro-

2 nizing signal, and a selector selects the second AGC signal when the segment synchronizing signal is detected and the first AGC signal when the segment synchronizing signal is not detected and provides the selected signal to the tuner/IF demodulator as the AGC signal.

To achieve the second object, there is provided an AGC method of a receiver for receiving an HDTV signal including a plurality of segments each formed of a segment synchronizing signal and a predetermined number of symbols, outputting an intermediate frequency (IF) signal having a uniform amplitude according to an AGC signal, and detecting the segment synchronizing signal from the IF signal, the AGC method including the steps of detecting the difference between the amplitude of an input IF signal and a previously set first reference value and generating a first AGC signal, detecting the difference between the amplitude of the segment synchronizing signal and a previously set second reference value and generating a second AGC signal, and selecting the second AGC signal when the segment synchronizing signal is detected, selecting the first AGC signal when the segment synchronizing signal is not detected, and applying the AGC signals.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
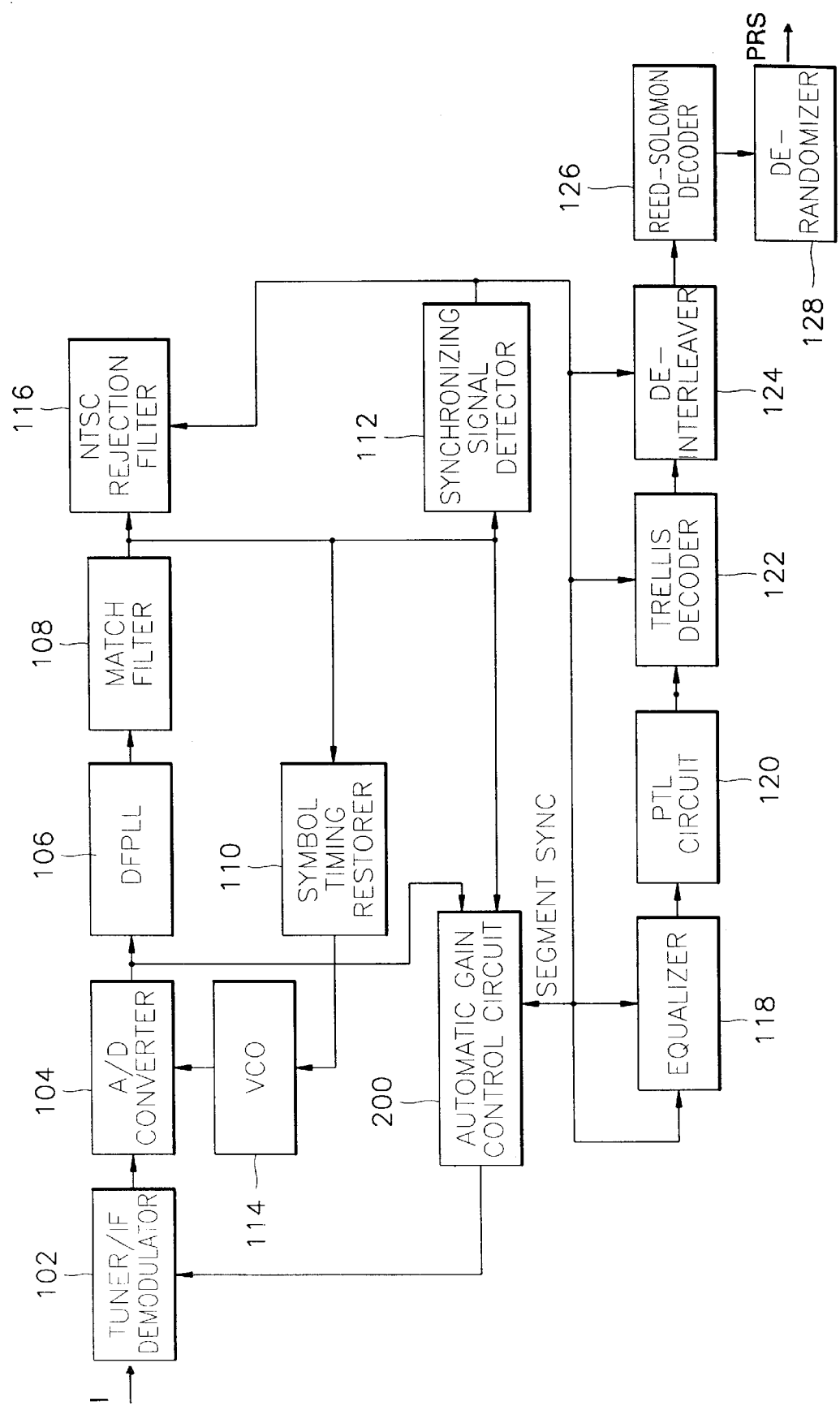
FIG. 1 is a block diagram showing the whole structure of a high definition TV to which the present invention is applied.

In the HDTV according to the present invention, as shown in FIG. 1, a tuner/IF demodulator 102 converts an input signal I received through antenna (not shown) into an IF signal of a predetermined frequency. An analog-to-digital (A/D) converter 104 converts an analog IF signal supplied from the tuner/IF demodulator 102 into a digital signal. A digital frequency and phase locked loop (DFPLL) circuit 106 restores a carrier wave using a pilot signal included in data output from the A/D converter 104, and multiplies the restored carrier wave by the output data of the A/D converter 104 to demodulate the carrier wave to data of a baseband.

A match filter 108 matches a demodulated baseband signal output from the DFPLL 106 to a pre-transmission signal. A symbol timing restorer 110 restores symbol timing using the output signal of the match filter 108.

A synchronizing signal detector 112 detects various synchronizing signals using the output signal of the match filter 108 and provides the synchronizing signals to respective portions. The synchronizing signal detector 112 obtains the correlation values of the data output from the match filter 108 in four symbol units, accumulates the obtained correlation values in a segment unit, and generates a segment synchronizing signal at a position in which a maximum correlation accumulative value is detected in every data segment using the fact that the correlation value of a four data segment synchronous symbol has the maximum value.

Figure 2:
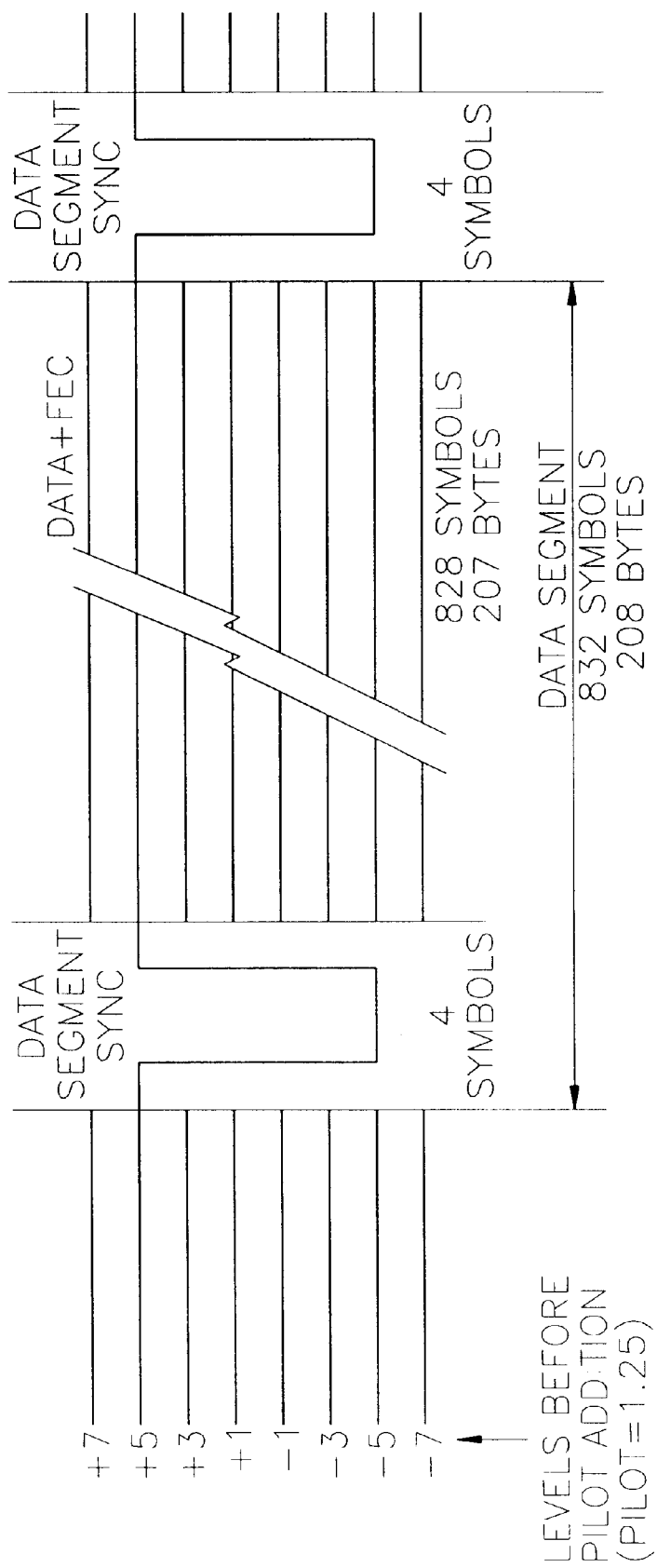
FIG. 2 shows the structure of a data segment of a GA-HDTV format.

FIG. 2 shows the structure of a data segment of a vestigial sideband (VSB).

In FIG. 2, 832 symbols (208 bytes) comprised of 828 symbol data and four symbol data segment synchronization comprise one data segment. The data segment synchronizing signal is inserted into a beginning portion of the respective data segments of eight-level (±7, ±5, ±3, and ±1) digital data streams. At this time, the data segment synchronizing signal is formed of a uniform pattern in which four symbols have the values of +5, −5, −5, and +5, respectively and the remaining data has an optional level among eight-levels. FEC denotes a forward error code.

A voltage controlled oscillator (VCO) 114 outputs a symbol clock signal to the A/D converter 104 as a sampling clock signal, adjusting the symbol timing restored in the symbol timing restorer 110.

Meanwhile, an NTSC rejection filter 116 for preventing the deterioration of the HDTV signal due to an NTSC signal in co-channel circumstances in which the HDTV signal and the NTSC signal are simultaneously broadcast removes carrier components of the NTSC signal from the output of the match filter 108. An equalizer 118 removes multi-path noise generated when the transmitted signal passes through a transfer channel. The multi-path noise distorts the frequency characteristics of the HDTV signal.

A phase tracking loop (PTL) circuit 120 removes noises of a phase which are not removed in the DFPLL circuit 106, namely, the error of the phase. A Trellis decoder 122 performs slicing and convolutional decoding with respect to the output of the PTL circuit 120 in order to protect it against a burst interference such as impulse noise or an NTSC co-channel interference.

A de-interleaver 124 de-interleaves the output of the Trellis decoder 122. A Reed-Solomon (R/S) decoder 126 corrects the error of the de-interleaved data using a parity. A de-randomizer 128 outputs the error-corrected data as a pseudo-random sequence (PRS) code.

Meanwhile, an AGC circuit 200 responds to the amplitude of a signal output from the A/D converter 104 and a segment synchronizing signal detected from the synchronizing signal detector 112, generates an AGC signal according to the average amplitude value of the segment synchronizing signal output from the match filter 108, and provides the signal to the tuner/IF demodulator 102. The tuner/IF demodulator 102 controls the amplitude of the IF signal according to the AGC signal.

Figure 3:
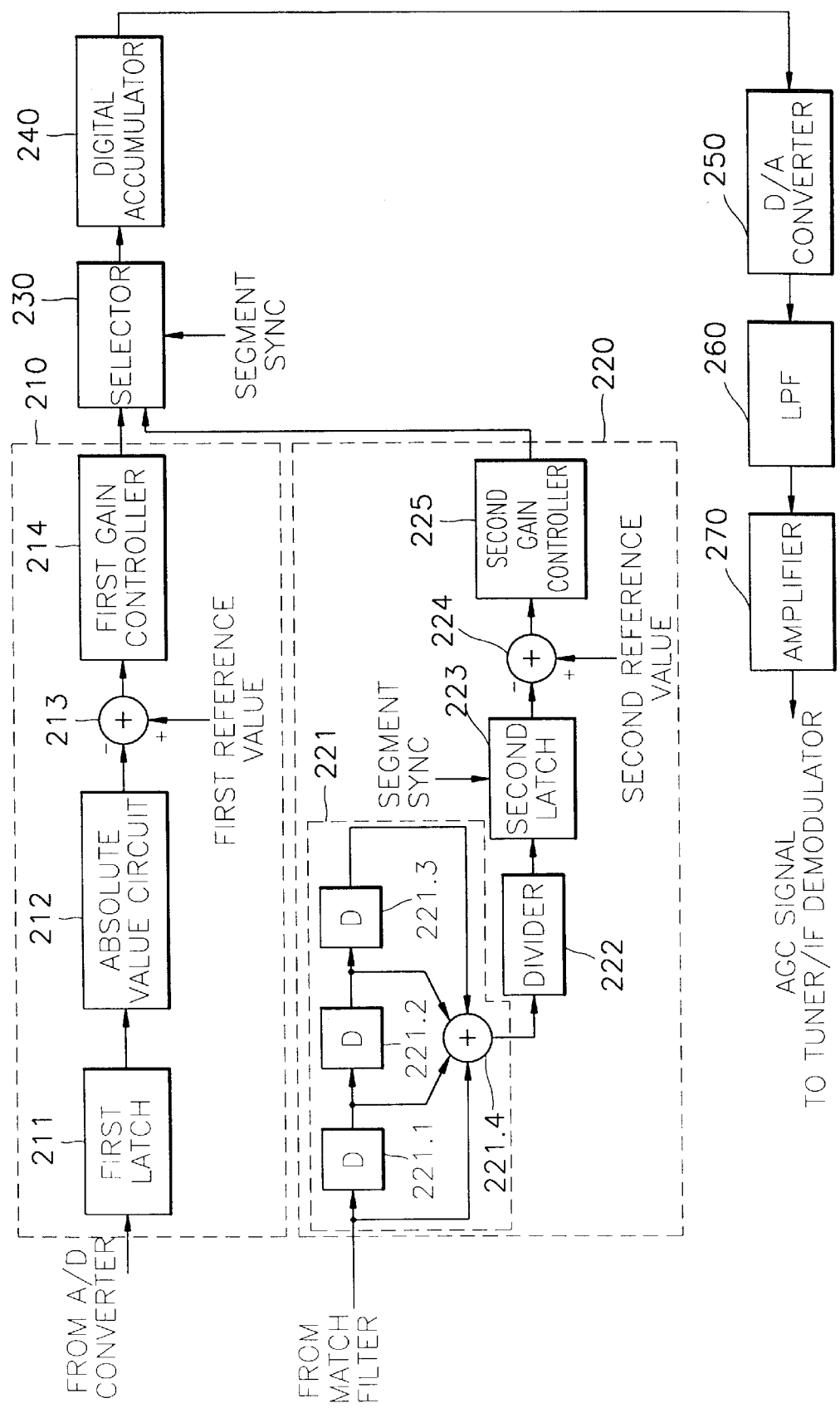
FIG. 3 is a circuit diagram showing the structure of an automatic gain control circuit according to an embodiment of the present invention.

FIG. 3 is a circuit diagram of the AGC circuit of an HDTV receiver according to an embodiment of the present invention.

A non-coherent AGC signal generator 210 of the AGC circuit 200 of the present invention includes a first latch 211 for latching the output signal of the A/D converter 104 of FIG. 1, an absolute value circuit 212 for obtaining the absolute value of the output of the first latch 211, a first subtractor 213 for subtracting the output of the absolute value circuit 212 from a first reference value, and a first gain controller 214 for controlling the gain according to the output of the first subtractor 213.

A coherent AGC signal generator 220 includes a 4-symbol adder 221 for adding the signal output from the match filter 108 of FIG. 1 in a 4-symbol unit, a divider 222 for dividing the output of the 4-symbol adder 221 and obtaining an average, a second latch 223 for latching the output of the divider 222 according to the segment synchronizing signal detected in the synchronizing signal detector 112 of FIG. 1, a second subtractor 224 for subtracting the output of the second latch 223 from a second reference value, and a second gain controller 225 for controlling the gain according to the output of the second subtractor 224. Here, three unit symbol delays are connected in series in the 4-symbol adder 221. The 4-symbol adder 221 is comprised of an adder 221.4 for adding the outputs of the respective unit symbol delays 221.1 through 221.3.

A selector 230 comprised of a multiplexer selects the output signal of the non-coherent AGC signal generator 210 or the output signal of the coherent AGC signal generator 220. A digital accumulator 240 accumulates the output signal of the selector 230. A digital-to-analog (D/A) converter 250 converts the output signal of the digital accumulator 240 into an analog signal. A low-pass filter 260 filters the output signal of the D/A converter 250. An amplifier 270 amplifies the filtered signal and applies the amplified AGC signal to the tuner/IF demodulator 102 shown in FIG. 1.

The operation of the apparatus shown in FIG. 3 will be described with reference to FIG. 1.

In FIG. 3, the first latch 211 of the non-coherent AGC signal generator 210 holds the HDTV signal output from the A/D converter 104 of FIG. 1. The absolute value circuit 212 obtains the absolute values of all the signals output from the first latch 211 and converts the signals into positive values.

The first subtractor 213 subtracts the output signal of the absolute value circuit 212 from the first reference value. When the output signal of the absolute value circuit 212 is larger than the first reference value, the output of the first subtractor 213 has a negative value. When the output signal of the absolute value circuit 212 is less than the first reference value, the output of the first subtractor 213 has a positive value. Here, the first reference value is a constant which can be obtained through experiment.

The first gain controller 214 applies the AGC signal, in which the gain of the signal output from the first subtractor 213 is controlled, to a first input terminal of the selector 230. Therefore, an AGC signal for decreasing the amplitude of the IF signal output from the tuner/IF demodulator 102 of FIG. 1 is output when the output of the first subtractor 213 has a negative value and an AGC signal for increasing the amplitude of the IF signal output from the tuner/IF demodulator 102 is output when the output of the first subtractor 213 has a positive value.

As mentioned above, the AGC signal is generated using the magnitudes of all the input signals in the non-coherent AGC signal generator.

Meanwhile, a signal input to the 4-symbol adder 221 of the coherent AGC signal generator 220 is the HDTV signal output from the match filter 108 of FIG. 1. With respect to this signal, symbol timing restoration and carrier wave restoration are performed in the symbol timing restorer 110 and the DFPLL 106 on the digital signal output from the A/D converter 104.

Therefore, the 4-symbol adder 221 obtains the average of the added value obtained in the 4-symbol unit by adding the input signals in the 4-symbol unit and dividing the outputs of the 4-symbol adder 221 by 4 in the divider 222.

The second latch 223 performs a timing hold with respect to the outputs of the divider 222 by the segment synchronizing signal output from the synchronizing signal detector 112 of FIG. 1. Namely, only the average value of the 4-symbols which are segment synchronizing signal portions shown in FIG. 2 are output through the second latch 223 since the second latch 223 outputs the latched signal only when the segment synchronizing signal is generated.

The second subtractor 224 subtracts the output signal of the second latch 223 from a second reference value. When the output signal of the second latch 223 is larger than the second reference value, the output of the second subtractor 224 has a negative value. When the output signal of the second latch 223 is less than the second reference value, the output of the second subtractor 224 has a positive value.

The second gain controller 225 applies the AGC signal in which the amplitude of the signal output from the second subtractor 224 is controlled to the second input terminal of the selector 230.

Therefore, the AGC signal for decreasing the amplitude of the IF signal of the tuner/IF demodulator 102 is output when the output of the second subtractor 224 has a negative value and the AGC signal for increasing the amplitude of the IF signal of the tuner/IF demodulator 102 is output when the output of the second subtractor 224 has a positive value. As mentioned above, the AGC signal is generated using the average amplitude value of the segment synchronizing signal in the coherent AGC signal generator.

The selector 230 selects an output signal of the non-coherent AGC signal generator 210 or the output signal of the coherent AGC signal generator 220 according to the segment synchronizing signal. When the segment synchronizing signal is correctly detected in the synchronizing signal detector 112 of FIG. 1, the selector 230 selects the output signal of the coherent AGC signal generator 220.

The digital accumulator 240 continuously accumulates signals selected in the selector 230. The D/A converter 250 converts the values accumulated in the accumulator 240 into analog signals. The low-pass filter 260 filters (accumulates) the output signal of the D/A converter 250 in an analog manner. The amplifier 270 amplifies the amplitude of the filtered signal and applies the signal to the tuner/IF demodulator 102 shown in FIG. 1. The tuner/IF demodulator 102 controls the amplitude of the IF signal according to the AGC signal output from the amplifier 270.

It is possible to maintain a uniform amplitude though the amplitude of the signal of the tuner/IF demodulator 102 changes since the outputs of the first and second subtractors 213 and 224 become negative and reduce the amplitude of the input signal when the HDTV signal input to the tuner/IF demodulator 102 and the segment synchronizing signal loaded on the HDTV signal are larger than the first reference value set in the non-coherent AGC signal generator 210 and the second reference value set in the coherent AGC signal generator 220 and the outputs of the first and second subtractors 213 and 224 become positive and increase the amplitude of the input signal when the HDTV signal input to the tuner/IF demodulator 102 and the segment synchronizing signal loaded on the HDTV signal are less than the first reference value set in the non-coherent AGC signal generator 210 and the second reference value set in the coherent AGC signal generator 220.

In the present invention, the amplitude of the received signal is controlled within a short time using the non-coherent AGC method having a fast response time before a system is stabilized and the amplitude of the received signal is controlled more accurately using the coherent AGC method after the segment synchronizing signal is detected. Thus, it is possible to correctly control the amplitude using the coherent AGC method since the method operates only in the portion in which the segment synchronizing signal is generated.

Also, the present invention can be applied to a digital video recording apparatus as well as a digital TV including a digital GA-HDTV system.

It is possible to uniformly maintain the level of the received signal even if a signal having a severely fluctuating amplitude is input to the receiver due to various channel circumstances during the transmission and to correctly demodulate the received signal in the receiver using the present invention in the HDTV receiver.

What is claimed is:

1. An automatic gain control (AGC) circuit for a receiver including a tuner/IF demodulator for receiving a high definition signal having a plurality of segments each formed of a segment synchronizing signal and a predetermined number of symbols and outputting an intermediate frequency (IF) signal of a predetermined level according to an automatic gain control (AGC) signal, and a synchronizing signal detector for detecting the segment synchronizing signal from the IF signal, the AGC circuit comprising:

a non-coherent AGC signal generator to generate a first AGC signal according to a magnitude of said IF signal;

a coherent AGC signal generator to generate a second AGC signal according to a magnitude of said segment synchronizing signal; and a selector to select said second AGC signal in response to said synchronizing signal detector detecting said segment synchronizing signal and said first AGC signal in response to said synchronizing signal detector not detecting said segment synchronizing signal, and to provide the selected signal to said tuner/IF demodulator as said AGC signal, wherein said coherent AGC signal generator generates said second AGC signal using an average magnitude of said segment synchronizing signal.

2. An AGC circuit as claimed in claim 1, wherein said non-coherent AGC generator comprises:

a first latch to latch said IF signal and, in response, outputting a first latched signal;

an absolute value circuit to obtain an absolute value of said first latched signal;

a first subtractor to subtract the absolute value from a first reference value and, in response, generating a difference; and a first gain controller to generate said first AGC signal according to the difference, to control a gain of said high definition signal.

3. An AGC circuit as claimed in claim 2, wherein the difference has a negative value when the absolute value is larger than said first reference value and the difference has a positive value when the absolute value is less than said first reference value.

4. An AGC circuit as claimed in claim 1, wherein said coherent AGC signal generator comprises:

a 4-symbol adder to receive said high definition signal in a 4-symbol unit and, in response, generating a plurality of processed signals, and adding the processed signals, to generate a sum signal, a divider to obtain an average of the plurality of processed signals of said 4-symbol adder using said sum signal, a second latch to latch the average of said divider and outputting a second latched signal according to said latched average and said segment synchronizing signal, a second subtractor to subtract said second latched signal from a second reference value to generate a difference, and a second gain controller to generate said second AGC signal according to the difference, to control a gain of said high definition signal.

5. An AGC circuit as claimed in claim 4, wherein the difference has a negative value when said second latched signal is larger than the second reference value, and the difference has a positive value when said second latched signal is less than said second reference value.

6. An AGC circuit as claimed in claim 1, further comprising an accumulator to accumulate a plurality of the selected signals of said selector and, in response, generating an accumulated signal.

7. An AGC circuit as claimed in claim 6, further comprising an amplifier to amplify said accumulated signal of said accumulator.

8. An AGC circuit as claimed in claim 7, further comprising:
- a digital-to-analog (D/A) converter to convert said accumulated signal of said accumulator into an analog signal; and
- a low-pass filter to low-pass filter said analog signal of said D/A converter.

9. An automatic gain control (AGC) method of a receiver for receiving a high definition television (HDTV) signal including a plurality of segments each formed of a segment synchronizing signal and a predetermined number of symbols, outputting an intermediate frequency (IF) signal having a uniform amplitude according to an AGC signal, and detecting the segment synchronizing signal from said IF signal, the AGC method comprising the steps of:
- (a) detecting a first difference between an amplitude of an input IF signal and a previously set first reference value, to generate a first AGC signal;
- (b) detecting a second difference between an amplitude of said segment synchronizing signal and a previously set second reference value, to generate a second AGC signal;
- (c) selecting said second AGC signal in response to said segment synchronizing signal being detected, and selecting said first AGC signal in response to said segment synchronizing signal not being detected, and using a selected one of said first and second AGC signals to adjust said IF signal; and
- (d) generating said second AGC signal by obtaining an average value of amplitudes of said segment synchronizing signal and detecting an error between the average value and said second reference value.

10. An AGC method as claimed in claim 9, wherein the first AGC signal has a negative value when a magnitude of said IF signal is larger than said first reference value and said first AGC signal has a positive value when the magnitude of said IF signal is less than the first reference value in said step (a).

11. An AGC method as claimed in claim 9, wherein said second AGC signal has a negative value when said segment synchronizing signal is larger than said second reference value and said second AGC signal has a positive value when said segment synchronizing signal is less than said second reference value in said step (b).

12. An AGC method as claimed in claim 9, wherein said first reference value is a predetermined constant and said second reference value is an average amplitude of said segment synchronizing signal.

13. A receiver which receives a high definition television (HDTV) signal having a plurality of segments each including a segment synchronizing signal and a predetermined number of symbols, the receiver comprising:
- a tuner to receive and convert said HDTV signal to an intermediate frequency signal including said segment synchronizing signal according to an automatic gain control (AGC signal); and
- a gain control unit to compensate for a change in amplitude of said received HDTV signal by generating said AGC signal in accordance with an amplitude of said intermediate frequency signal and an average amplitude value of said segment synchronizing signal over a plurality of predetermined time intervals.

14. A receiver as claimed in claim 13, wherein said gain control unit comprises an automatic gain control circuit, said automatic gain control circuit including
- a synchronizing signal detector to detect said segment synchronizing signal;
- a non-coherent AGC signal generator to generate a first AGC signal according to a magnitude of said intermediate signal;
- a coherent AGC signal generator to generate a second AGC signal according to a magnitude of said segment synchronizing signal; and
- a selector to select said second AGC signal as said AGC signal in response to said synchronizing signal detector detecting said segment synchronizing signal and to select said first AGC signal as said AGC signal in response to said synchronizing signal detector not detecting said segment synchronizing signal.

15. A receiver as claimed in claim 14, wherein said non-coherent AGC generator comprises:
- a first latch to latch said intermediate frequency signal and, in response, generate a first latched signal;
- an absolute value circuit to determine an absolute value of said first latched signal;
- a first subtractor to subtract said absolute value from a first reference value and, in response, to generate a first difference; and
- a first gain controller to generate said first AGC signal according to said first difference.

16. A receiver as claimed in claim 14, wherein said coherent AGC generator comprises:
- an averaging unit to determine the average amplitude value of said intermediate frequency signal over the plurality of predetermined time intervals;
- a second latch to latch said the average amplitude value based upon said segment synchronizing signal, to generate a second latched signal;
- a second subtractor to subtract said second latched signal from a second reference value, to generate a second difference; and
- a second gain controller to generate said second AGC signal according to said second difference.

17. A receiver as claimed in claim 15, wherein said coherent AGC generator comprises:
- an averaging unit to determine the average amplitude value of said intermediate frequency signal over the plurality of predetermined time intervals;
- a second latch to latch said the average amplitude value based upon said segment synchronizing signal, to generate a second latched signal;
- a second subtractor to subtract said second latched signal from a second reference value, to generate a second difference; and
- a second gain controller to generate said second AGC signal according to said second difference.

18. A receiver as claimed in claim 16, wherein said averaging unit comprises:
- a 4-symbol adder having three delay units consecutively connected, to add said intermediate frequency signal in a 4-symbol unit as a sum; and a divider divide the sum by four to obtain the average amplitude value.

19. A receiver as claimed in claim 17, wherein said averaging unit comprises:
   a 4-symbol adder having three delay units consecutively connected, to add said intermediate frequency signal in a 4-symbol unit as a sum; and
   a divider to divide the sum by four to obtain the average amplitude value.

20. A receiver as claimed in claim 14, wherein said automatic gain control circuit further comprises:
   a digital accumulator to accumulate a plurality of said first and second AGC signals output from said selector and, in response, generating an accumulated signal;
   a D/A converter to convert said accumulated signal to an analog signal;
   a low-pass filter to low-pass filter said analog signal; and
   an amplifier to amplifier to said filtered signal and, in response, generating said AGC signal.

21. A receiver as claimed in claim 17, wherein said automatic gain control circuit further comprises:
   a digital accumulator to accumulate a plurality of said first and second AGC signals output from said selector and, in response, generating an accumulated signal;
   a D/A converter to convert said accumulated signal to an analog signal;
   a low-pass filter to low-pass filter said analog signal; and
   an amplifier to amplifier to said filtered signal and, in response, generating said AGC signal.

22. A receiver as claimed in claim 14, wherein said gain control unit further comprises:
   an A/D convert to convert said intermediate frequency signal from said tuner to a digital signal in accordance with a symbol clock signal;
   a digital frequency and phase locked loop (DFPLL) circuit to restore a carrier wave using a pilot signal included in data of said digital signal and multiplies said carrier wave by said data of said digital signal to demodulate said carrier wave to data of a baseband; and
   a match filter to match said demodulated baseband data to a pre-transmission signal of said received signal, to generate a matched signal;
   a symbol timing restorer to restore symbol timing of said matched signal, to generate a restored symbol timing signal; and
   a voltage controlled oscillator to generate said symbol clock signal in response to said restored symbol timing signal;
   wherein said non-coherent AGC signal generator uses said digital signal to generate said first AGC signal and said coherent signal AGC signal generator uses said matched signal to generate said second AGC signal.

23. A receiver as claimed in claim 17, wherein said gain control unit further comprises:
   an A/D convert to convert said intermediate frequency signal from said tuner to a digital signal in accordance with a symbol clock signal;
   a digital frequency and phase locked loop (DFPLL) circuit to restore a carrier wave using a pilot signal included in data of said digital signal and multiplies said carrier wave by said data of said digital signal to demodulate said carrier wave to data of a baseband; and
   a match filter to match said demodulated baseband data to a pre-transmission signal of said received signal, to generate a matched signal;
   a symbol timing restorer to restore symbol timing of said matched signal, to generate a restored symbol timing signal; and
   a voltage controlled oscillator to generate said symbol clock signal in response to said restored symbol timing signal;
   wherein said first latch latches said digital signal to generate said first latched signal, said averaging unit determines the average amplitude value using said matched signal, and said second latch latches said average amplitude value based upon said segment synchronizing signal.

24. A receiver as claimed in claim 23, further comprising an NTSC rejection filter to remove carrier components of an NTSC signal from said matched signal when said HDTV signal and an NTSC signal are simultaneously broadcast in a co-channel.

25. A receiver as claimed in claim 23, further comprising:
   an equalizer to remove multi-path noise from said matched signal generated when said HDTV signal passes through a transfer channel, to generate an equalized signal;
   a phase tracking loop to remove noise of a phase of said equalized signal, to generate a noise reduced signal;
   a Trellis decoder to slice and convolutional decode said noise reduced signal, to generate a decoded signal;
   a de-interleaver to de-interleave said decoded signal, to generate a de-interleaved signal;
   a Reed-Solomon decoder to correct an error of said de-interleaved signal using a parity, to generate an error corrected signal; and
   a de-randomizer to convert said error corrected signal to a pseudo-random sequence code.

26. A receiver which receives a high definition television (HDTV) signal having a plurality of segments each including a segment synchronizing signal and a predetermined number of symbols, the receiver comprising:
   a tuner to receive and convert said HDTV signal to an intermediate frequency signal including said segment synchronizing signal according to an automatic gain control (AGC signal); and
   a gain control unit to perform a first type of compensation for a change in amplitude of said received HDTV signal prior to said segment synchronizing signal being detected by generating a first AGC signal AGC signal in accordance with an amplitude of said intermediate frequency signal and performing a second type of compensation more accurate than said first type for the change of amplitude of said received HDTV signal subsequent to said segment synchronizing signal being detected by generated a second AGC signal as said AGC signal in accordance with an amplitude value of said segment synchronizing signal.

* * * * *